April 22, 1924.
M. H. GOMEZ
1,491,692
STATION INDICATOR
Filed July 29, 1922    4 Sheets-Sheet 1
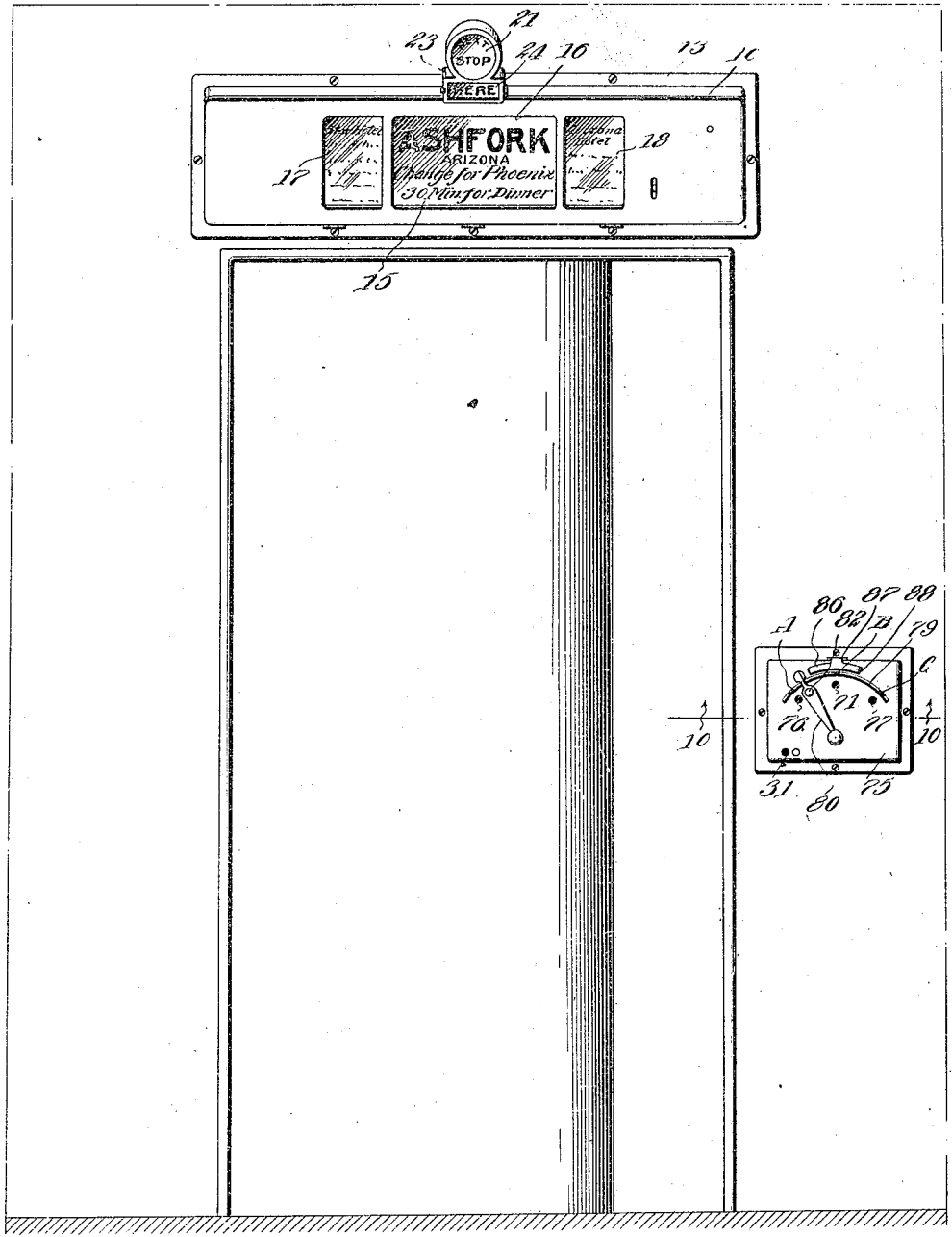

April 22, 1924.  M. H. GOMEZ  1,491,692
STATION INDICATOR
Filed July 29, 1922      4 Sheets-Sheet 2
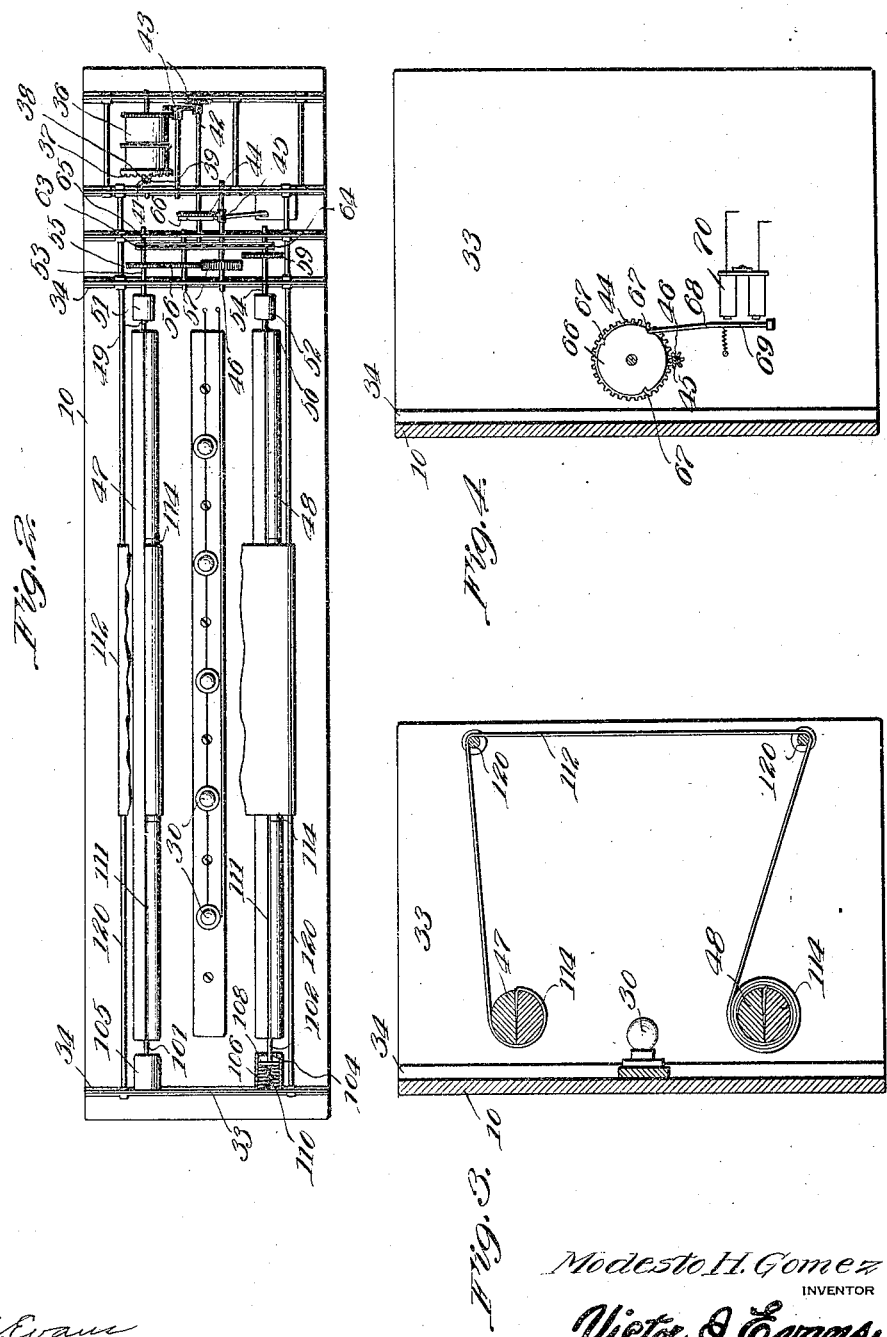

April 22, 1924.
M. H. GOMEZ
1,491,692
STATION INDICATOR
Filed July 29, 1922    4 Sheets-Sheet 3
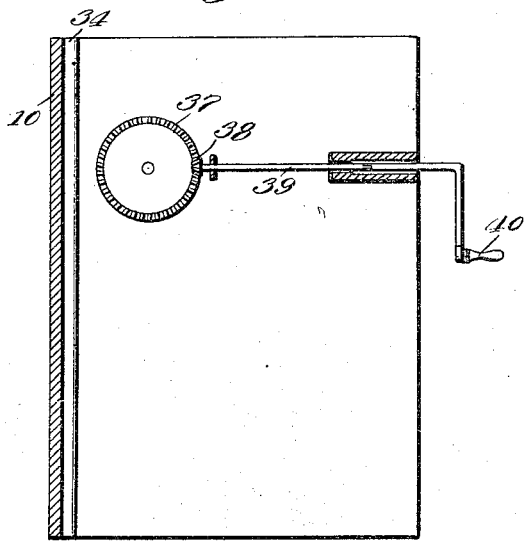
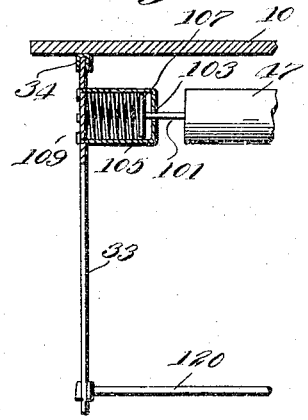
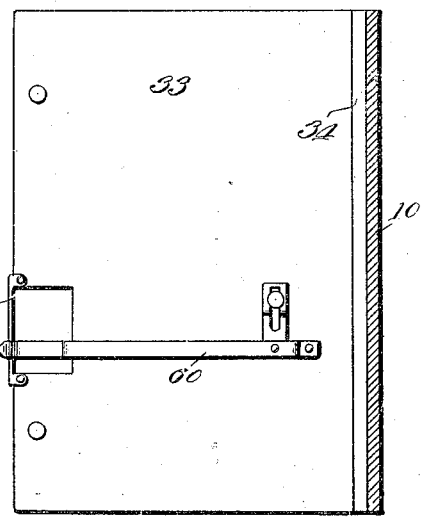
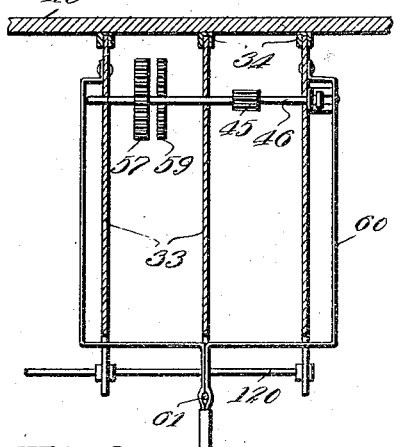
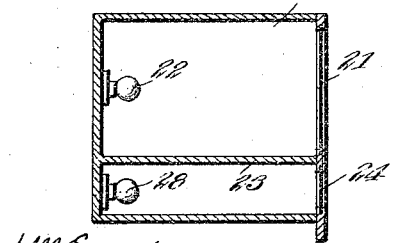

April 22, 1924.
M. H. GOMEZ
STATION INDICATOR
Filed July 29, 1922  4 Sheets-Sheet 4
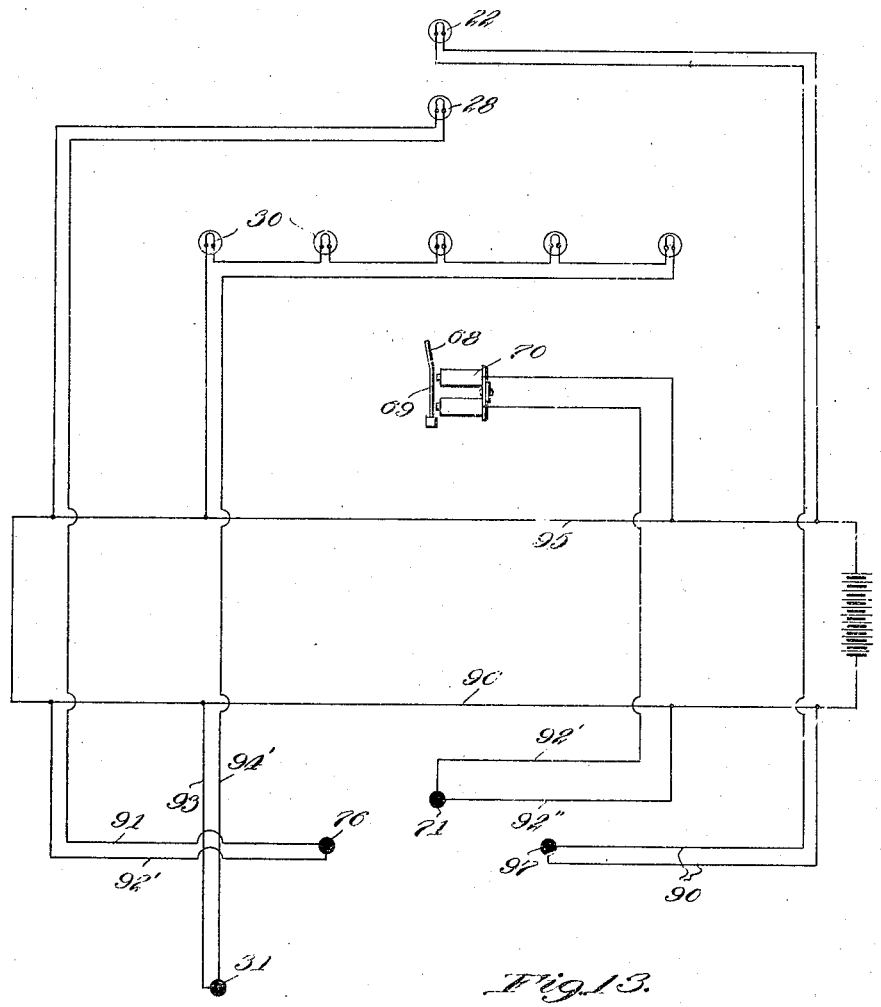
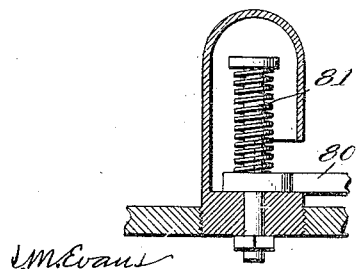
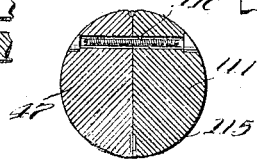
Modesto H. Gomez
INVENTOR
BY Victor J. Evans
ATTORNEY Patented Apr. 22, 1924.

1,491,692

UNITED STATES PATENT OFFICE.

MODESTO H. GOMEZ, OF OLD ALBUQUERQUE, NEW MEXICO.

STATION INDICATOR.

Application filed July 29, 1922. Serial No. 578,328.

*To all whom it may concern:*

Be it known that I, MODESTO H. GOMEZ, a citizen of Mexico, residing at Old Albuquerque, in the county of Bernalillo and State of New Mexico, have invented new and useful Improvements in Station Indicators, of which the following is a specification.

The object of this invention is to provide an indicator adapted for use on railway cars, or street cars, for indicating the stations or street designations, or names, and to provide for the illumination of separate signals, in a particular manner hereinafter specified.

A further object is to provide means for controlling a travelling element carrying the designations, and means for indicating whether the name being displayed is that of a station at which a train may be standing, or the name of the station at which the next stop will be made.

A further object is to provide a particular form of electric control involving both the lighting and the movement of the display devices.

A still further object is to provide a motor driven display apparatus operable upon the release of an electrical device, and means whereby the release is effected incidentally to the control of the lighting system directing attention to the name of the next station, or the station actually reached, as the case may be.

With the foregoing and other objects in view, the invention consists in the novel construction and arrangement of elements described and claimed, it being understood that modifications may be made within the scope of the claims without departing from the spirit of the invention.

In the drawings, Figure 1 shows the device in front elevation, as being mounted above the doorway of a car, and on the inner side,—the controlling device appearing at the right;

Figure 2 is a vertical longitudinal sectional view through the casing of the device;

Figure 3 is a vertical transverse section;

Figure 4 is a transverse vertical section through the casing, and illustrating controlling means including an electro-magnet;

Figure 5 is a transverse section through the casing, showing the winding means;

Figures 6, 7 and 8 are details of construction described below;

Figure 9 is a section through the casing, showing lamps mounted therein;

Figure 10 is a section on line 1—10 of Figure 1, the view showing the construction of the controlling switch and the connections therefor;

Figure 11 is a diagrammatic view of the circuits of the apparatus;

Figure 12 shows the spring mounting of the arm 80 of the controlling switch,—the housing for the switch appearing in vertical section;

Figure 13 is a plan view of the outer end of arm 80;

Figure 14 is a section through this end portion;

Figure 15 is a transverse section of one of the rollers of Figure 2, the roller being in two parts connected by springs.

The casing 10 may be proportioned to permit of mounting just above the door of a railway car, the front portion of the casing, and the travelling element being slightly inclined forwardly and downwardly, to permit of easy reading by the passengers. In order to facilitate the mounting of the casing, a metallic strip 13 may be employed for securing the rear wall of the casing to the woodwork of the car structure.

The travelling element 15 carries the station or street designations, and operates adjacent to the central opening 16 in the front of the casing. Panels 17 and 18 at opposite sides or ends, of openings 16 afford opportunity for advertising purposes. If the advertising matter is carried by the travelling element, and relates particularly to the station appearing at a given time through openings 16, these notices will be displayed through openings 17 and 18. Advertising matter of a purely general nature may be carried directly by the front of the casing.

Above the casing 10, means is provided for mounting illuminating devices. The upper housing is provided with a glass front 21, through which a white light appears, the words "Next stop" being carried by the element 21. This sign is illuminated by a lamp 22. The housing 23 is provided with a glass front 24 carrying the word "Here," this sign being illuminated when the train is at the station shown by the display device. The element 24 may show a red light, or any other desired color.

In order to provide illumination directly for the travelling element and the designations carried thereby, a series of lamps 30 is mounted centrally and longitudinally of the casing, and is controlled by a switch 31. These lamps need only be lighted at night or when the occasion demands. The circuit is independent of the circuits for the lamp 22 and lamp 28 in housing 23.

Several partition members 33 are mounted in the vertical channels 34 in casing 10, and in the partition members the operative elements for the travelling member are mounted. Any suitable drive may be employed, but in the present case I have shown a spring motor 36 including a barrel carrying gear teeth 37 engaged by a pinion 38 on the shaft 39 with which a winding crank 40 is connected. A pawl 41 serves an obvious purpose.

Power is transmitted from the motor to the shaft 42 through the gearing 43, and gear wheel 44 on the shaft 42 meshes with pinion 45 on the shaft 46.

Rollers 47 and 48 are provided with axial members 49 and 50 connected, respectively, by couplings or the like 51, 52, with the shafts 53 and 54. The shaft 53 carries a gear wheel 55 meshing with gear wheel 56, and the latter being driven by a gear wheel 57 on the shaft 46, and rotating therewith. The necessary drive for upper roller 47 is thus provided, and in order to impart movement to the lower roller 48, when required, I provide a gear wheel 59 on the shaft 54, with which the gear wheel 57 may be brought into mesh by shifting the shaft 46 and said gear wheel 57, by means of a forked lever 60, the latter engaging the end portions of the shaft 46, and being movable about a vertical axis, represented by a shaft 61. Gear wheels 57 may therefore be in mesh with gear wheel 56, or gear wheel 59, as required to permit direct drive to be imparted from the shaft 46. The shafts 53 and 54 also carry sprocket wheels 63 and 64, and a sprocket chain 65 passes around the wheels, so that when direct drive is imparted to either roller, indirect rotation is also imparted to the other roller 47 or 48 as the case may be.

The spring motor imparts movement to the travelling display element when the electrically controlled escapement is released. Formed with, or carried by, the gear wheel 44 is a notched portion, or element 66, the notches 67 being spaced as shown and corresponding with the distance to be moved by each operation of the travelling element in displaying the name of a new station. The notches 67 are engaged by an arm 68 carried by the armature 69 of magnet 70. This magnet is energized when a push button 71 is depressed.

The push button just referred to is mounted in a box 75, which also mounts push buttons 76 and 77, the former controlling the red light for displaying the word "Here" when the train has arrived at the station indicated on that portion of the travelling element opening 16 of the casing 10.

The push button 77, when depressed closes a circuit for the white light, or lamp 22, directing attention to the words "Next stop" displayed in the upper housing 20. The circuits remain closed only as long as the push buttons are depressed, the latter being returned to normal position by spring 78.

A segmental member 79 is provided with notches, such as A, B, C, and the lever 80 pressed by a spring 81, engages any one of these notches, and tends to depress any one of the push buttons over which it is passed. Lever 80 is provided with a handle 82, and if the lever or arm drops into notch A, push button 76 will be depressed and the circuit will be completed for the red light represented by lamp 28. When this station has been passed, the conductor or operator throws the arm 80 to the right and when it drops into notch C, push button 77 is depressed, and the white light represented by lamp 22 is energized, thus calling attention to the next stop, displayed on the glass 21.

During this movement of arm 80, the travelling element 15 was allowed to move the distance between the two station designations represented by the rotation of wheel through one third of a revolution. This operation took place when the push button 71 was depressed by reason of the lever or arm 80 dropping into shallow depression designated B. This depression permits the downward movement of the arm under the action of the spring 81 but the depression B provides no abrupt stop, and the lever continues to move by operation over the whole of the segment 79.

The end of the arm 80 is formed as shown in cross section, being provided with portions 84 and 85 as shown. When the arm 80 moves toward the right, portion 85 guides the arm under element 86 supported by bracket 87 over segment 79. Guiding member 86 thus tends to depress arm 80 in the movement from left to right but in the movement of the arm 80 from right to left, after the white light has been deenergized, portion 84 tends to pass over downwardly extending portions 88 of element 86, so that the end of the arm passes over this element last named, and push button 71 is not operated, since it is not desired to energize magnet 70 or to move the travelling member when the lights are shifted from sign 21, "Next stop," to sign 24 displaying the word "Here." The contacts made by the push buttons include the resilient metallic element, hereinbefore referred to and the metallic elements 89, these elements of course being normally separated.

A diagrammatic view of the circuits is shown in Figure 11, the wires for the "Next stop" sign being designated 90. The wires for the sign displaying the word "Here" are indicated 91', 92'; the wires for the magnet 70, are designated 92', 92'', and the wires for those lamps illuminating the travelling element directly are designated 93, 94'. The main feed wires are shown at 95, and 96.

The pins 101, 102, carried by rollers 47, 48, are formed as shown and enter the apertures 103, 104, in the casings 105, 106. The ends of these pins bear on the disks 107, 108, against which the coiled springs 109, 110, press, so that the rollers are properly held, but are permitted to rotate under the action of the devices above described. Each roller is provided with a longitudinal channel 111, engaged by the elements 112, and a spring controlled device 114, is hinged at 115, springs 116, 117, being connected with element 114, and the body of the roller 47 and roller 48, in the manner shown. It may be added that the rods 120 connect the vertical partitions 33 and act as tie rods.

What is claimed is:—

1. In an apparatus of the class described, means for indicating streets or stations, a plurality of electric signals, controlling means governing the illuminating means and permitting the indicating means to advance one step after one of the electric signals is deenergized and before the other is energized, and means operating to cause said indicating means to remain stationary when the controlling means causes the illumination of the signals in reverse order.

2. In an apparatus of the class described, an indicating device, driving means therefor, an escapement controlling the driving means, electric means controlling the escapement, a plurality of illuminated signals, and a circuit closing device by the operation of which in one direction, contacts are made for one signal, then for the means controlling the escapement, and then for the other signal and a device cooperating with the circuit closing device acting to permit some of the contacts to be closed to the exclusion of the other, upon the reverse movement of the circuit closing device.

3. In an apparatus of the class described, an indicating device, electrically operated signals therefor, electrically operated controlling mechanism for the indicating device and signals, and deflecting means in the path of a movable element of the controlling mechanism for rendering the latter inactive, under given conditions so far as the indicating device is concerned.

4. In an apparatus of the class described, means for indicating streets or stations, a plurality of electric signals indicating respectively when a station the name of which is displayed is reached by a train, and when the next station is being approached, actuating means for the indicating means, a releasing device for the actuating means, contacts and circuits for the signals and releasing device, and means for energizing the signals, respectively, before and after the contacts for the releasing device are closed.

In testimony whereof I affix my signature.

MODESTO H. GOMEZ.